(12) United States Patent
Maeda et al.

(10) Patent No.: US 9,010,944 B2
(45) Date of Patent: Apr. 21, 2015

(54) PROJECTION TYPE IMAGE DISPLAY APPARATUS

(75) Inventors: Norio Maeda, Moriguchi (JP); Kohei Wataru, Sakai (JP); Kazuhiko Inoue, Sakai (JP); Masahiro Terada, Osaka (JP); Takashi Ohta, Amagasaki (JP); Yasumasa Sawai, Yamatotakada (JP)

(73) Assignee: Konica Minolta Opto, Inc., Tokyo (JP)

( * ) Notice: Subject to any disclaimer, the term of this patent is extended or adjusted under 35 U.S.C. 154(b) by 257 days.

(21) Appl. No.: 12/922,657

(22) PCT Filed: Mar. 17, 2009

(86) PCT No.: PCT/JP2009/055117
§ 371 (c)(1),
(2), (4) Date: Sep. 14, 2010

(87) PCT Pub. No.: WO2009/116510
PCT Pub. Date: Sep. 24, 2009

(65) Prior Publication Data
US 2011/0019109 A1   Jan. 27, 2011

(30) Foreign Application Priority Data

Mar. 18, 2008 (JP) ................................. 2008-069694

(51) Int. Cl.
*G03B 21/14* (2006.01)
*G03B 21/00* (2006.01)
*H04N 9/31* (2006.01)

(52) U.S. Cl.
CPC ................ *G03B 21/00* (2013.01); *H04N 9/317* (2013.01)

(58) Field of Classification Search
CPC ........ G03B 21/26; G03B 21/21; G03B 21/14; H04N 3/22; H04N 3/23
USPC .................................................... 353/101, 69
See application file for complete search history.

(56) References Cited

U.S. PATENT DOCUMENTS

| 5,537,168 A * | 7/1996 | Kitagishi et al. ............... 353/101 |
| 2005/0259226 A1 * | 11/2005 | Gilg et al. ........................ 353/69 |

(Continued)

FOREIGN PATENT DOCUMENTS

| JP | 59-137917 | 8/1984 |
| JP | 5-053193 A | 3/1993 |

(Continued)

OTHER PUBLICATIONS

International Search Report for International Application No. PCT/JP2009/055117 mailed Apr. 13, 2009, x pages.

*Primary Examiner* — William C Dowling
*Assistant Examiner* — Jerry Brooks
(74) *Attorney, Agent, or Firm* — Brinks Gilson & Lione

(57) ABSTRACT

A projection type image display apparatus (1) comprises a focus correction system (30). The system includes a temperature detection mechanism (16) for measuring temperature in the vicinity of a projection lens group (13), a correction amount calculation unit (18) for calculating a correction amount for correcting the focus shift caused by a temperature change, and a driving signal generation unit (19) for generating, based on the correction amount, a driving signal for driving a focus adjustment mechanism (15). If the user performs a focus adjustment using a focus operation input unit (23), a focus operation determination unit (21) determines that a focus adjustment has occurred independently of the focus correction system and changes a correction condition stored in a memory (20).

4 Claims, 9 Drawing Sheets

(56) References Cited

U.S. PATENT DOCUMENTS

2007/0008505 A1* 1/2007 Eguchi .................. 353/101
2007/0182940 A1 8/2007 Asai
2007/0252955 A1* 11/2007 Asai ...................... 353/69

FOREIGN PATENT DOCUMENTS

| | | |
|---|---|---|
| JP | 2007-241260 A | 9/2007 |
| JP | 2008-233551 A | 10/2008 |
| WO | WO 2009/116510 A1 | 9/2009 |

* cited by examiner

PROJECTION TYPE IMAGE DISPLAY APPARATUS

TECHNICAL FIELD

The present invention relates to a projection type image display apparatus that magnifies and projects an image that is formed by a reflection type image forming device such as a digital micro-mirror device (DMD) or the like or by a transmission type image forming device such as a transmission type liquid crystal device or the like, and more particularly, to a structure of a projection type image display apparatus that includes a system which corrects a time-dependent change of a focus based on a specific physical amount.

BACKGROUND ART

Conventionally, for example, projection type image display apparatuses such as a projector, a rear projection television set and the like are widespread. A projection type image display apparatus is provided with a projection lens that projects an image which is formed by a reflection type image forming device such as a digital micro-mirror device (DMD) or the like or by a transmission type image forming device such as a transmission type liquid crystal device or the like. The projection lens that the projection type image display apparatus includes is usually disposed in the apparatus with held by a lens hold frame.

In such a projection type image display apparatus, during projection, the temperature of the projection lens and the temperature of the lens hold frame that holds the lens are raised by the energy of light from a light source in some cases. As an influence of this, for example, the refractive index of the projection lens changes, or the lens hold frame thermally expands, so that the position of the projection lens deviates in some cases. In such a case, a focus deviation of an image projected onto a screen occurs, which is a problem. Especially, in a projector and the like in which high resolution is required, anomalous dispersion glass whose refractive index is considerably changed by heat is used for the projection lens in many cases, the above focus deviation tends to become considerable.

Regarding this point, measures against the focus deviation due to a temperature change of the lens are conventionally reported. For example, in a patent document 1 proposes a structure in which a means that detects a temperature and generates a signal corresponding to the temperature is disposed, so that a focus change is not caused by the temperature. This structure is a structure shown in FIG. 10, for example.

In FIG. 10, 101 indicates a projection lens group; 102 indicates a temperature detection mechanism that detects a temperature in the vicinity of the projection lens group 101 and outputs a signal corresponding to the detected temperature; 103 indicates a focus correction amount calculation means that decides a focus correction amount based on the temperature detected by the temperature detection mechanism; 104 indicates a focus correction member drive mechanism that performs a focus adjustment of the projection lens group 101 based on the correction amount decided by the focus correction amount calculation means 103.

DISCLOSURE OF THE INVENTION

Problems to be Solved by the Invention

Here, in the above projection type image display apparatus that includes a focus correction system which measures a temperature and corrects a time-dependent change of the focus based on the temperature information, the timing a correction is started by the focus correction system becomes important. Specifically, for example, if a focus correction is started at the same time as the power supply of the apparatus is turned on, in some cases, the focus is deviated at the start time point or the correction is started under conditions different from projection conditions (e.g., focal length and the like) that are actually used. In such a case, even if the focus is performed by the focus correction system, it is impossible to perform a suitable correction.

Besides, in the projection type image display apparatus such as a projector or the like, a user is able to perform a focus adjustment and the like at free timing. Accordingly, a use condition of the apparatus is changed by an operation by the user, so that a suitable focus correction is likely to become impossible. In a conventional system that performs a focus correction based on temperature information, a focus deviation amount is corrected based on a temperature change amount corresponding to the temperature at a time of focusing, so that if a focus adjustment is performed during use, the correction is not exactly performed in some cases.

Further, the projection lens that the projection type image display apparatus such as a projector or the like includes has generally unevenness in the production. Besides, the use environment where the projection type image display apparatus is used is not necessarily a constant environment and there is unevenness in the use environment. Accordingly, even if a focus correction by the focus correction system is performed by using a condition that is prepared in advance by an experiment or the like, an exact focus correction is not performed in some cases.

In light of the above problems, it is an object of the present invention to provide a projection type image display apparatus that includes a system for correcting a time-dependent change of a focus based on a specific physical amount and performs suitably a focus correction by using the system.

Means for Solving the Problem

To achieve the above object, a projection type image display apparatus according to the present invention includes: a projection optical system that includes a focus lens whose position is movable along an optical axis; a temperature sensor that measures a temperature in the vicinity of the projection optical system; a memory that stores lens position data that represent a relationship between the temperature measured by the temperature sensor and the position of the focus lens; a focus lens control portion that controls the position of the focus lens based on temperature information from the temperature sensor and the lens position data; a determination portion that determines whether or not there is a movement of the focus lens that is not performed by the focus lens control portion; and a lens position data correction portion that, in a case where the determination portion determines that there is a movement of the focus lens that is not performed by the focus lens control portion, corrects the lens position data based on a movement amount of the focus lens in the movement.

In the projection type image display apparatus having the present structure, the focus lens control portion controls the position of the focus lens based on the temperature information and the lens position data; and a focus correction system is included to correct a time-dependent change of the focus. Besides, it is possible to recognize by using the determination portion that there is a movement of the focus lens which is not performed by the focus lens control portion, for example, a movement of the focus lens or the like which is performed by a user. And, in a case where there is such a movement, based on the amount of the lens movement, it is possible to correct the lens position data that are stored in advance. Accordingly, for example, even if the lens position data stored in advance are unsuitable because of unevenness in the lens production, unevenness in the use environment and the like, the data are suitably corrected and used. In other words, the projection type image display apparatus having the present structure has a learning function to correct the lens position data into more suitable data during the operation and is able to suitably perform the correction by using the focus correction system.

In the projection type image display apparatus having the above structure, in the case where the determination portion determines that there is the movement of the focus lens that is not performed by the focus lens control portion, the temperature information measured by the temperature sensor and the position information of the focus lens obtained immediately after the movement are stored into the memory; and the lens position data correction portion, immediately before the turning-off of a power supply of the apparatus, corrects the lens position data based on the temperature information and the position information of the focus lens that are stored in the memory.

In the projection type image display apparatus having the above structure, it is preferable that the determination portion is so disposed as to be able to determine whether or not there is a movement of the focus lens that is performed by a user. The projection type image display apparatus is generally structured in such a way that a focus adjustment is able to be performed by a user. Accordingly, it is desirable that it is possible to determine whether or not there is a movement of the focus lens that is performed by the user. As a specific structure, the projection type image display apparatus having the above structure further includes an input means with which the user moves the focus lens; wherein, based on presence of an operation of the input means, the determination portion is able to determine whether or not there is a movement of the focus lens that is not performed by the focus lens control portion.

The projection type image display apparatus having the above structure further includes a displacement detection means that detects a position displacement of the focus lens, based on a signal from the displacement detection means, the determination portion may determine whether or not there is a movement of the focus lens that is not performed by the focus lens control portion. According to this structure, the focus correction by the focus correction system is able to be performed by suitably dealing with a focus operation (e.g., rotation of a focus ring or the like) as well by the user from a means other than the input means.

To achieve the above object, the present invention is a projection type image display apparatus that has a focus correction system which corrects a time-dependent change of a focus based on a specific physical amount, the projection type image display apparatus includes a determination portion that determines whether or not there is a focus operation that is not performed by the focus correction system; wherein in a case where it is determined by the determination portion that there is the focus operation, the focus operation system changes a correction condition to a new condition to perform a correction.

According to the present structure, in the case where there is the focus operation that is not performed by the focus correction system, the focus correction system corrects the correction condition into the new condition to perform the correction. Accordingly, the focus correction by the focus correction system is unlikely to be performed under an unsuitable condition. Accordingly, according to the present structure, it becomes possible to suitably perform the focus correction by using the focus correction system.

In the projection type image display apparatus having the above structure, the determination portion may be so disposed as to be able to determine whether or not there is the focus operation that is performed by a user. In the projection type image display apparatus, a condition change is able to be freely performed by the user and such a situation is likely to occur. In this point, according to the present structure, the correction by the focus correction system is able to be performed by suitably dealing with the focus operation by the user.

As a specific structure of the projection type image display apparatus having the above structure, based on presence of an operation of an input means that is disposed to give a command for an operation of the focus, the determination portion may determine whether or not there is the focus operation.

In the projection type image display apparatus having the above structure, based on a signal from a displacement detection means that detects a displacement of a lens position at a focus operation time, the determination portion determines whether or not there is a focus operation that is not performed by the focus correction system. According to this structure, it is possible to perform the focus correction by the focus correction system by suitably dealing with a focus operation (e.g., rotation of a focus ring or the like) as well by the user from a means other than the input means.

In the projection type image display apparatus having the above structure, the specific physical amount is a temperature, and in a case where it is determined by the determination portion that there is the focus operation, a correction start temperature of the focus correction system may be updated to a new temperature. It is easy to compose the focus correction system that performs the focus correction based on the temperature. The present structure is applicable to the projection type image display apparatus that includes the focus correction system.

In the projection type image display apparatus having the above structure, the specific physical amount is a temperature; the focus correction system corrects the time-dependent change of the focus by moving a position of a focus lens based on lens position data that is related to the temperature; and in a case where it is determined by the determination portion that there is the focus operation, the lens position data may be corrected based on a movement amount of the focus lens performed by the focus operation; and the focus correction system may perform the correction by using the corrected lens position data as the new condition. The projection type image display apparatus having the present structure has a learning function to correct the lens position data into more suitable data during the operation and is able to suitably perform the correction by using the focus correction system.

Advantages of the Invention

According to the present invention, it is possible to provide a projection type image display apparatus that includes a system for correcting a time-dependent change of a focus based on a specific physical amount and performs suitably a focus correction by using the system.

Figure 1:
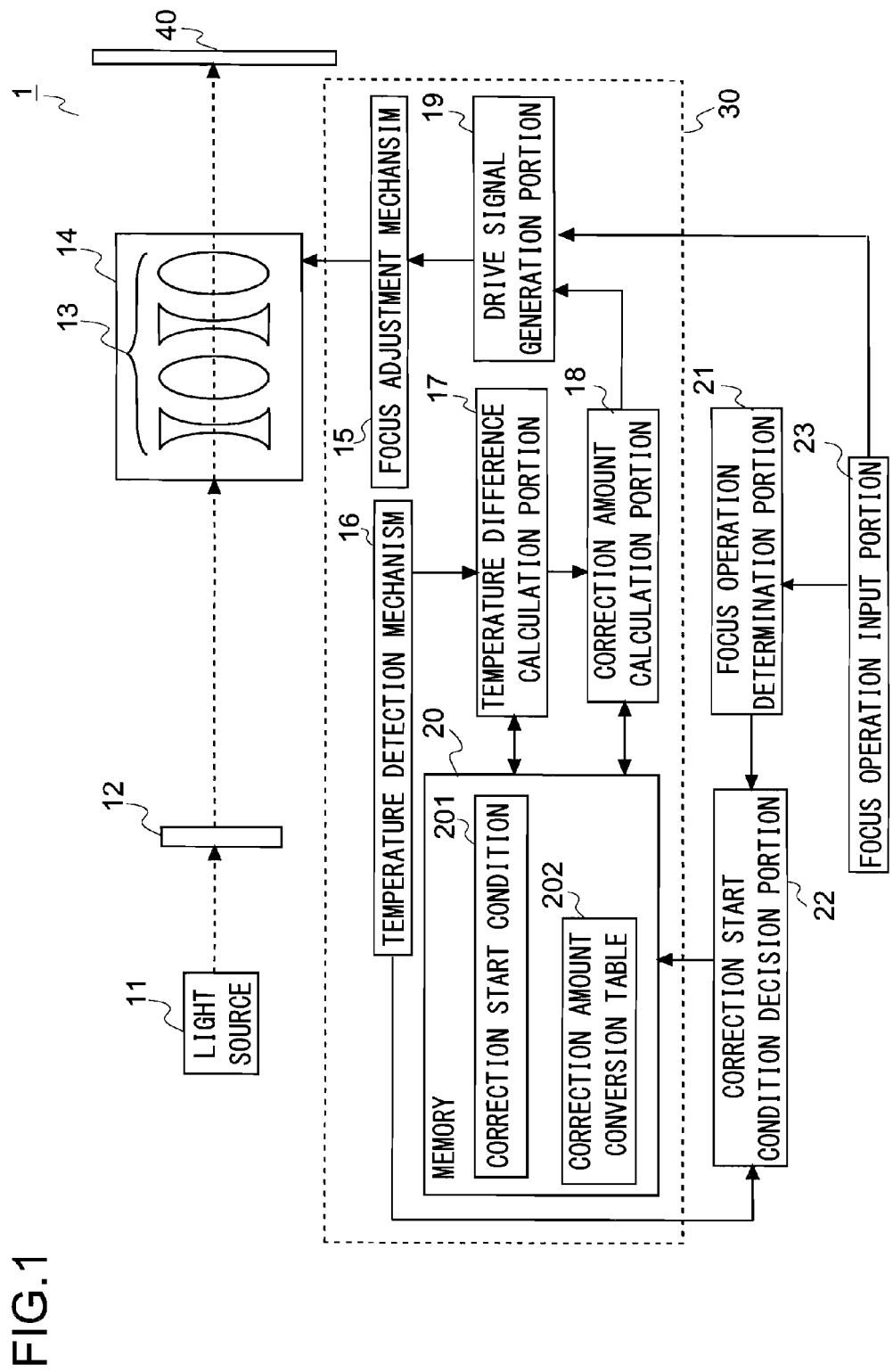
[FIG. 1] is a block diagram showing a structure of a projection type image display apparatus according to a first embodiment.

LIST OF REFERENCE SYMBOLS 1, 2, 3, 4 projection type image display apparatus
13 projection lens group
14 lens hold frame
16 temperature detection mechanism
21 focus operation determination portion
23 focus operation input portion
24 displacement sensor
30 focus correction system
33 focus lens control portion
34 memory
35 lens position data correction portion
341 lens position data Best Mode for Carrying out the Invention Hereinafter, the embodiments (first to fourth embodiments) of the projection type image display apparatus of the present invention are described with reference to the drawings.

<<First Embodiment>>

FIG. 1 is a block diagram showing a structure of a projection type image display apparatus according to a first embodiment. As shown in FIG. 1, the projection type image display apparatus 1 in the first embodiment includes: a light source 11; an image forming device 12; a projection lens group 13; a lens hold frame 14; a focus adjustment mechanism 15; a temperature detection mechanism 16; a temperature difference calculation portion 17; a correction amount calculation portion 18; a drive signal generation portion 19; a memory 20; a focus operation determination portion 21; a correction start condition decision portion 22; and a focus operation input portion 23.

The light source 11 includes a discharge lamp that uses a super-high pressure mercury lamp, for example. Illumination light from the light source 11 passes through a not-shown illumination optical system and reaches the image forming device 12. Here, for example, the illumination optical system is provided with: a color wheel that includes color filters, which are disposed on the circumference of the color wheel and transmit color light of red, blue and green, respectively, and rotates to color-separate the incident light in time division; an integrator rod that is formed of a rectangular-parallelepiped glass rod, makes the light passing through the color wheel totally reflect in an inner surface of the rod, overlaps the reflected light, and emits a luminous flux that has an even intensity distribution from an emission surface; and a lens group that guides the light emitted from the integrator rod to the image forming device 12.

The image forming device 12 includes a DMD (digital micro-mirror device), for example. A DMD is an image forming device that spatially modulates the incident light depending on a reflection direction. Although the structure of the DMD is well known, simply described, the DMD includes a mirror surface where many minuscule micro-mirrors are arranged two-dimensionally; each micro-mirror is able to switch a reflection angle independently in two directions. Each micro-mirror corresponds to a pixel of an image that is projected onto a screen 40.

A micro-mirror whose reflection angle is set in one of the two directions goes into an on state, reflects light from the illumination optical system, and guides the light to the screen 40 via the projection lens group 13. On the other hand, a micro-mirror whose reflection angle is set in the other of the two directions goes into an off state, reflects the light from the illumination optical system, and guides the light to a place different from the projection lens group 13. And, in this case, a black dot is displayed on the screen 40.

Here, in the present embodiment, the image forming device 12 is composed of a reflection type image forming device such as the DMD or the like; however, the image forming device 12 is not limited to this. In other words, of course, the image forming device 12 may be composed of a transmission type image forming device such as a liquid crystal device or the like.

The projection lens group 13 constitutes a projection optical system and magnifies and projects the light from the image forming device 12 onto the screen 40. The projection lens group 13 in the present embodiment is composed of a plurality of lenses; and it is possible to suitably modify the number of lenses and the shapes of lenses combined. Here, the projection lens group 13 includes a focus lens for performing a focus adjustment.

The projection lens group 13 is in a state of being held by the lens hold frame 14. The lens hold frame 14 is composed in such a way that the whole or part thereof is movable. According to this, by moving all or some lenses of the projection lens group 13 that constitutes the projection optical system, it is possible to perform a focus adjustment of the light emitted from the projection optical system.

The focus adjustment mechanism 15 is a mechanism that enables the focus adjustment of the light emitted from the projection optical system by moving the movable lens hold frame 14. For example, this mechanism is structured to include: a stepping motor; an output gear that is mounted on an output shaft of the stepping motor; and a gear groove (anything not shown) that is so formed on the lens hold frame 14 as to mesh with the output gear.

The temperature detection mechanism 16 is disposed to measure a temperature in the vicinity of the projection lens group 13 (in the vicinity of the projection optical system). The temperature detection mechanism 16 is composed of a temperature sensor, for example, such as a thermocouple, a temperature-measuring resistor or the like. For example, the temperature sensor is mounted with held by the lens hold frame 14. Especially, it is preferable that the temperature sensor is so mounted as to measure a temperature of the lens of the projection lens group 13 that is nearest to the image forming device 12. Or, in a case where the projection lens group 13 includes a lens that has an anomalous dispersion characteristic, it is preferable that the temperature sensor is so mounted as to measure a temperature of the lens that has the anomalous dispersion characteristic. The temperature information detected by the temperature detection mechanism 16 is output to the temperature difference calculation portion 17 and the correction start condition decision portion 22.

The temperature difference calculation portion 17 reads a temperature at a correction start time that is stored in the memory 20 as a correction start condition 201 and calculates a difference between the read temperature and the temperature sent from the temperature detection mechanism 16. The calculated temperature difference is output to the correction amount calculation portion 18. The calculation of the temperature difference is performed at predetermined intervals. The correction described here refers to a correction that resolves a deviation which occurs because the focus position of the projection optical system changes with time (mainly caused by a temperature change of a lens).

The correction amount calculation portion 18 calculates a focus correction amount by using the temperature difference calculation result output from the temperature difference calculation portion 17 and a correction amount conversion table 202 stored in the memory 20. The correction amount calculated here is the movement amount of a lens (focus lens) for correcting a deviation from the focus position at the start time of the focus correction. The calculated correction amount is output to the drive signal generation portion 19.

Based on the correction amount calculated by the correction amount calculation portion 18, the drive signal generation portion 19 generates a drive signal to drive the focus adjustment mechanism 15. And, based on the generated drive signal, the focus adjustment mechanism 15 operates, so that the focus correction of the projection optical system is performed. Here, in the present embodiment, because the stepping motor is used for the focus adjustment mechanism 15, it is possible to move the lens to a desired position based on the calculated correction amount. Besides, the drive signal generation portion 19 operates the focus adjustment mechanism 15 in response to a command from the focus operation input portion 23.

The memory 20 stores information that is necessary to correct a time-dependent change of the focus position of the projection optical system. In the present embodiment, the memory 20 stores the correction start condition 201 and the correction amount conversion table 202. As the correction start condition 201, for example, there are the temperature at the start time of the focus correction and the apparatus use condition and the like such as the focal length and the like. The correction amount conversion table 202 may store a relationship, in the form of a conversion table, between a temperature change and a correction amount (lens movement amount) that is obtained experimentally by using a prototype apparatus. Besides, a structure may be employed to store an approximate formula that represents the relationship between the temperature change and the correction amount that are obtained from the experimental result. Besides, an approximate formula (which represents the relationship between the temperature change and the correction amount) that is obtained from characteristics (e.g., thermal radiation rate and the like) of the lens used in the projection optical system is also enough.

Here, for example, because there is a case where the correction amount conversion table 202 needs to be changed depending on a zoom condition and the like, it is preferable that a plurality of correction amount conversion tables 202 are disposed to deal with the case. Besides, in the projection type image display apparatus 1 in the present embodiment, a structure is employed, in which the correction start condition 201 stored in the memory 20 is updated if necessary. This is described later. Besides, as described above, the focus adjustment mechanism 15, the temperature detection mechanism 16, the temperature difference calculation portion 17, the correction amount calculation portion 18, the drive signal generation portion 19, and the memory 20 function as a focus correction system 30 (a portion enclosed by a broken line in FIG. 1) that corrects a time-dependent change of the focus of the projection optical system based on the temperature information.

The focus operation determination portion 21 is a determination portion that determines whether or not there is a focus operation that is not performed by the focus correction system 30. The projection type image display apparatus 1 in the present embodiment is provided with the focus operation input portion 23, and the focus adjustment mechanism 15 operates in response to an input from the focus operation input portion 23. If a focus operation based on the focus operation input portion 23 is performed, the focus operation determination portion 21 receives the information of the focus operation and determines that there is a focus operation that is not performed by the focus correction system 30.

Here, the focus operation input portion 23 is an embodiment of an input means of the present invention which the user uses to move the focus lens and corresponds to, for example, a focus adjustment button or something like that, by pushing a switch of which it is possible to electrically adjust the focus. Besides, the focus operation input portion 23 may be so structured as to be disposed in the main body of the projection type image display apparatus 1 or may be so structured as to be disposed in a remote controller that remotely controls the projection type image display apparatus 1 by using infrared rays, for example.

The correction start condition decision portion 22 is able to obtain the current temperature from the temperature detection mechanism 16. Besides, based on the information from the focus operation determination portion 21, the correction start condition decision portion 22 decides a correction start condition. And, the decided condition is stored into the memory 20 as the correction start condition.

Figure 2:
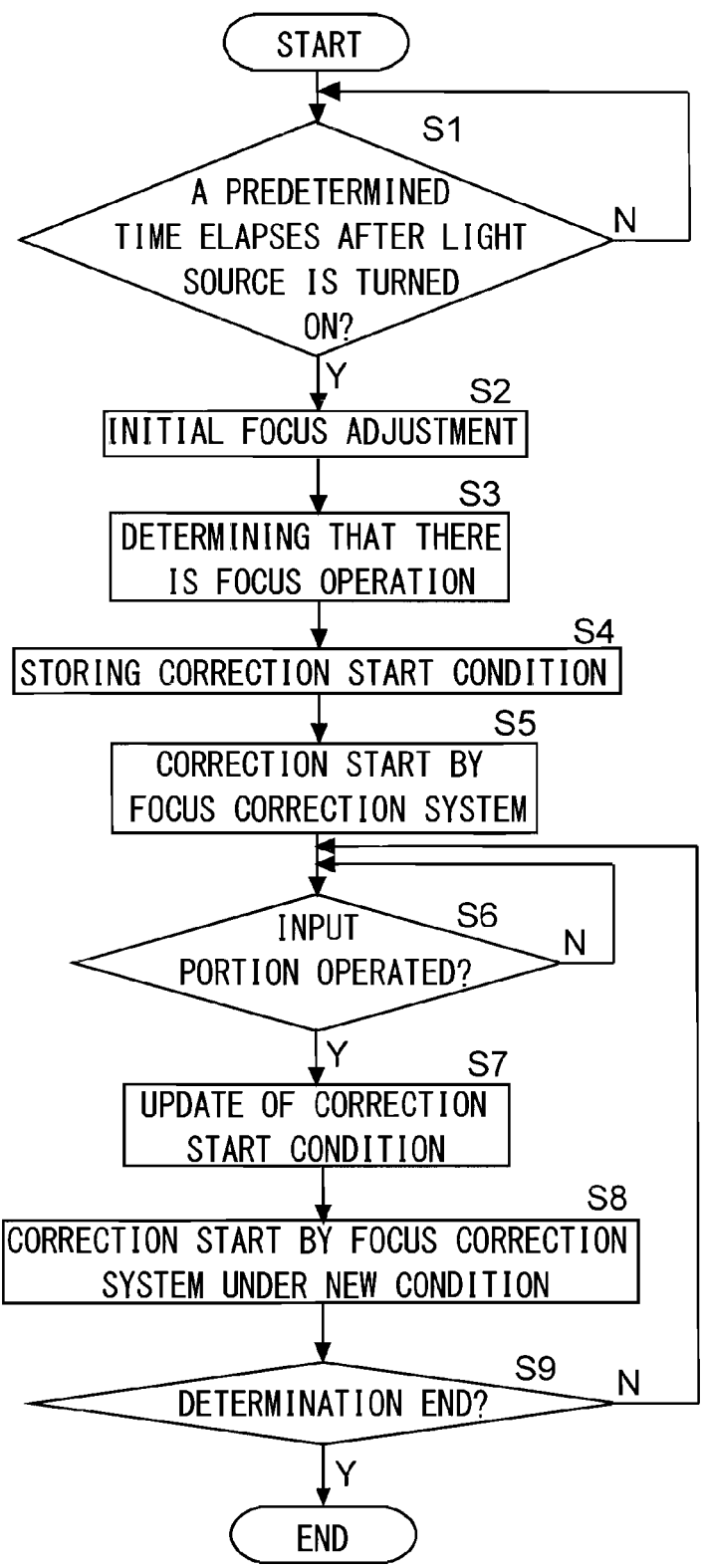
[FIG. 2] is a flow chart showing a flow that controls operation of a focus correction system in the projection type image display apparatus according to the first embodiment.

Next, in the above-structured projection type image display apparatus 1, a control operation to suitably operate the focus correction system 30 is described with reference to FIG. 2. FIG. 2 is a flow chart showing a flow that controls operation of the focus correction system in the projection type image display apparatus 1 in the first embodiment.

In the projection type image display apparatus 1 in the present embodiment, it is checked whether or not a predetermined time elapses after the light source 11 is turned on (step S1). This considers that the light amount from the light source 11 does not become constant until the predetermined time elapses after the light source 11 is turned on and that an exact correction is cannot be performed if the focus correction by the focus correction system 30 is started with the light amount from the light source 11 unstable.

As for the determination whether or not the predetermined time elapses, for example, after the light source 11 is turned on, time is counted by using an incorporated timer (not shown) and it is determined by checking whether or not the counted time exceeds the predetermined time that is stored in a memory or the like in advance. When the predetermined time elapses, it is displayed on an operation panel (not shown), for example, of the projection type image display apparatus 1. This operation panel is an embodiment of a notification means which notifies that the predetermined time elapses after the light source 11 is turned on. As another embodiment of the notification means, a lamp which notifies that the predetermined time elapses may emit light at a place of the apparatus main body. In this way, the user can realize that the predetermined time elapses after the light source 11 is turned on.

When the predetermined time elapses after the light source 11 is turned on, an initial focus adjustment is performed (step S2). The initial focus adjustment is performed when the user gives an operation command from the focus operation input portion 23. At this time, because the operation based on the focus operation input portion 23 is performed, the focus operation determination portion 21 determines that there is a focus operation (step S3).

Upon determining that there is a focus operation, the focus operation determination portion 21 notifies the correction start condition decision portion 22 of the determination result. The correction start condition decision portion 22 which is notified that there is a focus operation decides the current temperature output from the temperature detection mechanism 16 as the temperature at the correction start time; and stores the temperature into the memory 20 as the correction start condition 201 (step S4). Here, besides, use conditions such as the focal length and the like are also stored if necessary.

In this way, the correction by the focus correction system 30 is started (step S5). If the correction by the focus correction system 30 is started, the focus operation determination portion 21 monitors presence of an operation of the focus operation input portion 23 (step S6). If there is an operation of the focus operation input portion 23, the focus operation determination portion 21 notifies the correction start condition decision portion 22 of the presence information. And, the correction start condition decision portion 22 decides the current temperature output from the temperature detection mechanism 16 as the temperature at the correction start time; and updates the correction start condition 201 by resetting the previous condition (step S7). Here, besides, use conditions such as the focal length and the like are also updated if necessary.

Here, the focus operation by the focus operation input portion 23 after the correction start by the focus correction system 30 becomes necessary, for example, in a case where the apparatus main body is moved (case where the focal length is changed) or, for example, in a case where use conditions such as a zoom and the like are changed.

If the correction start condition 201 is updated, the focus correction system 30 starts the focus correction under the new condition (step S8). Thereafter, it is checked whether or not the determination by the focus operation determination portion 21 is to be ended (step S9); in a case where the determination is continued, the steps S6 to S9 are repeated.

As described above, according to the projection type image display apparatus 1 in the first embodiment, it is possible to operate, under a suitable operation condition, the focus correction system 30 that corrects the time-dependent change of the focus by using the temperature information.

Here, in the present embodiment, the correction by the focus correction system 30 is started after the predetermined time elapses after the light source 11 is turned on. However, a structure may be employed, in which the focus correction by the focus correction system 30 may be started at the same time as the power supply of the apparatus main body is turned on. In this case, there is a possibility that the focus is deviated at the turning-on time of the power supply; and it is thought that the focus adjustment is performed by the user, for example. If such a focus adjustment is performed, the correction by the focus correction system 30 is reset and the correction is started under a new condition. Accordingly, the focus correction by the focus correction system 30 is suitably performed.

<<Second Embodiment>>

Figure 3:
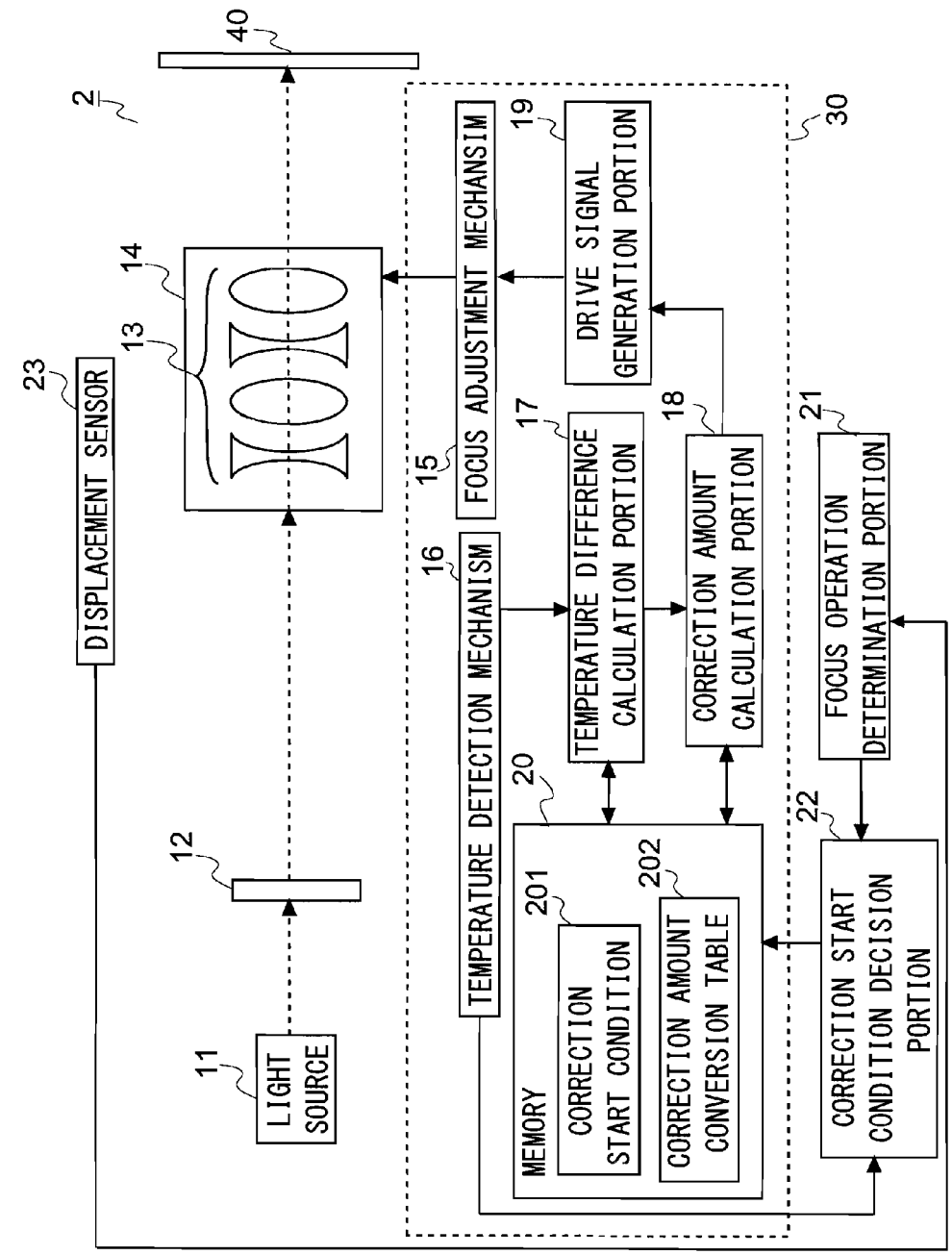
[FIG. 3] is a block diagram showing a structure of a projection type image display apparatus according to a second embodiment.

Next, a projection type image display apparatus in a second embodiment is described. FIG. 3 is a block diagram showing a structure of the projection type image display apparatus in the second embodiment. As shown in FIG. 3, the projection type image display apparatus in the second embodiment has substantially the same structure as the projection type image display apparatus 1 in the first embodiment. However, it is different from each other in that based on the information from the displacement sensor 24, the focus operation determination portion 21 determines whether or not there is a focus operation that is not performed by the focus correction system 30. Hereinafter, this different point is described; and the same portions as those in the first embodiment are indicated by the same reference numbers and description of them is skipped if it is not necessary.

The displacement sensor 24 is so disposed as to detect a displacement of the position of a lens of the projection lens group 13 that is used to perform the focus adjustment. As such a displacement sensor, there are, for example, an optical type sensor and the like that make use of triangulation; and the displacement sensor 24 is an embodiment of the displacement detection means in the present invention. The present embodiment employs a structure in which based on displacement information of a lens position by the displacement sensor 24, it is determined whether or not there is a focus operation that is not performed by the focus correction system 30, so that the focus correction system 30 is suitably operated.

Figure 4:
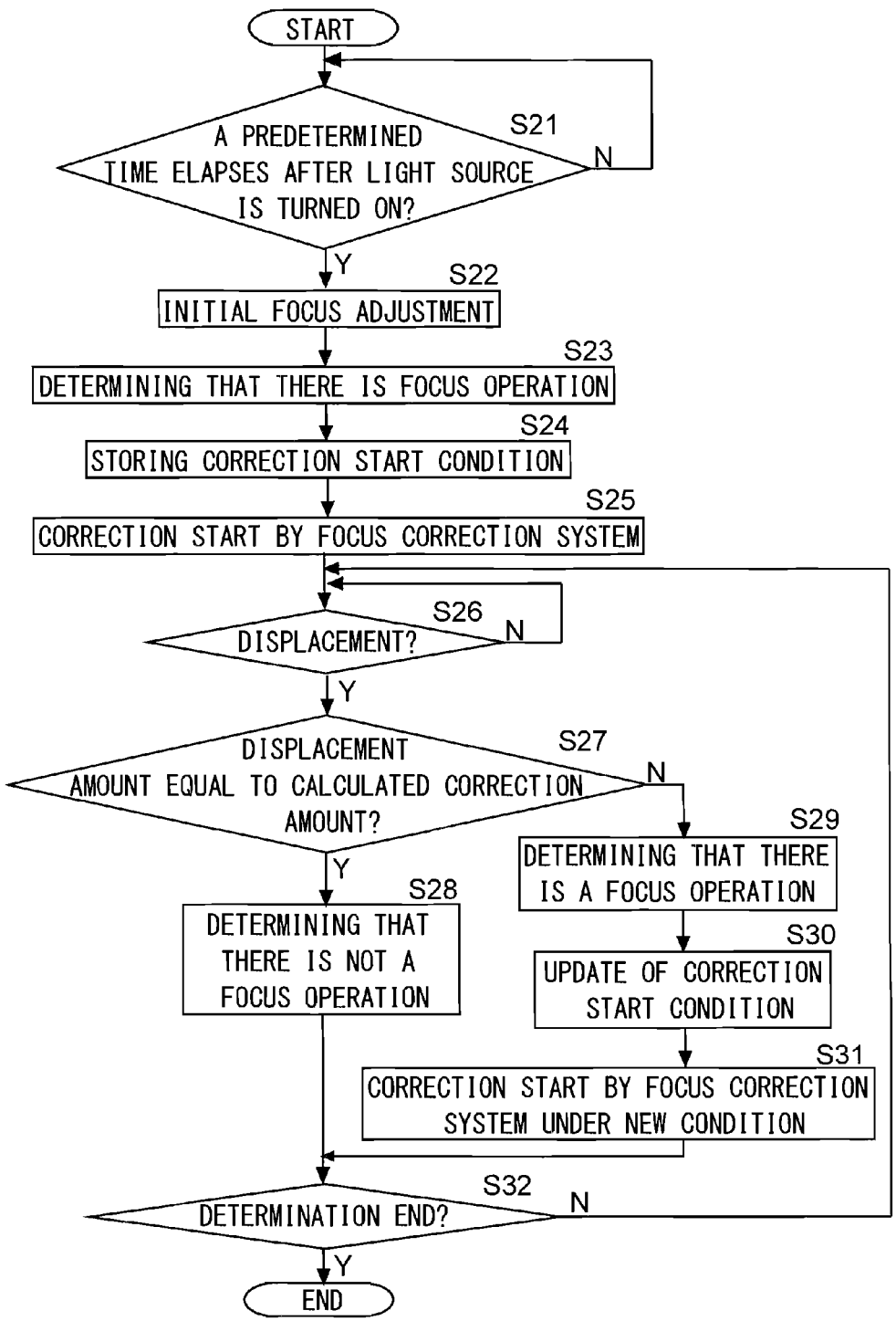
[FIG. 4] is a flow chart showing a flow that controls operation of a focus correction system in the projection type image display apparatus according to the second embodiment.

Hereinafter, in the projection type image display apparatus 2 in the second embodiment, a control operation to suitably operate the focus correction system 30 is described with reference to FIG. 4. FIG. 4 is a flow chart showing a flow that controls operation of the focus correction system 30 in the projection type image display apparatus 2 in the second embodiment.

In the projection type image display apparatus 2 as well in the second embodiment, like in the first embodiment, it is checked whether or not a predetermined time elapses after the light source 11 is turned on (step S21). If the predetermined time elapses (it is determined in the same way as in the first embodiment) after the light source 11 is turned on, an initial focus adjustment is performed (step S22). As for the initial focus adjustment, the user may perform the adjustment by rotating a focus ring that is disposed in the lens hold frame 14, for example; or like in the first embodiment, the focus adjustment may be performed by means of a focus operation button (focus operation input portion 23).

If the initial focus adjustment is performed, it is detected by the displacement sensor 24 that the lens for the focus adjustment is moved. Accordingly, the focus operation determination portion 21 determines that there is a focus operation that is not performed by the focus correction system 30 (step S23). Here, in this stage, because the focus correction by the focus correction system 30 is not started, a displacement is detected by the displacement sensor 24, so that it is possible to determine that there is a focus operation that is not performed by the focus correction system 30.

Upon determining that there is a focus operation, the focus operation determination portion 21 notifies the correction start condition decision portion 22 of the determination result. The correction start condition decision portion 22 which is notified that there is a focus operation decides the current temperature output from the temperature detection mechanism 16 as the temperature at the correction start time; and makes the memory 20 store the temperature as the correction start condition 201 (step S4). Here, besides, use conditions such as the focal length and the like are also stored if necessary.

In this way, the correction by the focus correction system 30 is started (step S25). If the correction by the focus correction system 30 is started, the focus operation determination portion 21 monitors whether or not there is a displacement of a lens based on the information from the displacement sensor 24 (step S26). If there is a displacement of a lens, it is checked whether or not the displacement amount of the lens is equal to the correction amount that is calculated by the correction amount calculation portion 18 at this time (step S27).

In a case where both are equal to each other, the focus operation determination portion 21 determines that the correction is a focus correction by the focus correction system 30 and determines that there is not a focus operation that is not performed by the focus correction system 30 (step S28). On the other hand, in a case where both are not equal to each other, the focus operation determination portion 21 determines that there is a focus operation that is not performed by the focus correction system 30 (step S29).

In the case where there is a focus operation that is not performed by the focus correction system 30, the focus operation determination portion 21 notifies the correction start condition decision portion 22 of the determination result. And, the correction start condition decision portion 22 decides the current temperature output from the temperature detection mechanism 16 as the temperature at the correction start time; and updates the correction start condition 201 by resetting the previous condition (step S30). Here, besides, use conditions such as the focal length and the like are also updated if necessary.

If the correction start condition 201 is updated, the focus correction system 30 starts the focus correction under a new condition (step S31). In both cases where the correction start condition 201 is updated and where the correction start condition 201 is not updated, thereafter, it is checked whether or not the determination by the focus operation determination portion 21 is to be ended (step S32); in a case where the determination is continued, the steps S26 to S32 are repeated.

Here, in the structure of the second embodiment, not only in a case where the focus operation is not performed by the focus correction system 30 but performed by the user but also in a case where the focus operation is not performed by the focus correction system 30 but performed by an auto-focus function, it is possible to operate the focus correction system 30 under a suitable operation condition.

<<Third Embodiment>>

As described above, for example, because of the uneven production and the like of the projection lens that constitutes the projection optical system, in the focus correction system that performs the focus correction by simply using the correction condition prepared in advance (e.g., the correction amount conversion table in the first and second embodiments), there is a case where the time-dependent change of the focus cannot be exactly corrected. Accordingly, the projection type image display apparatus in the third embodiment is structured to have a learning function in which the focus correction by the focus correction system is performed changing the correction condition prepared in advance to a better condition. Hereinafter, this is described.

Figure 5:
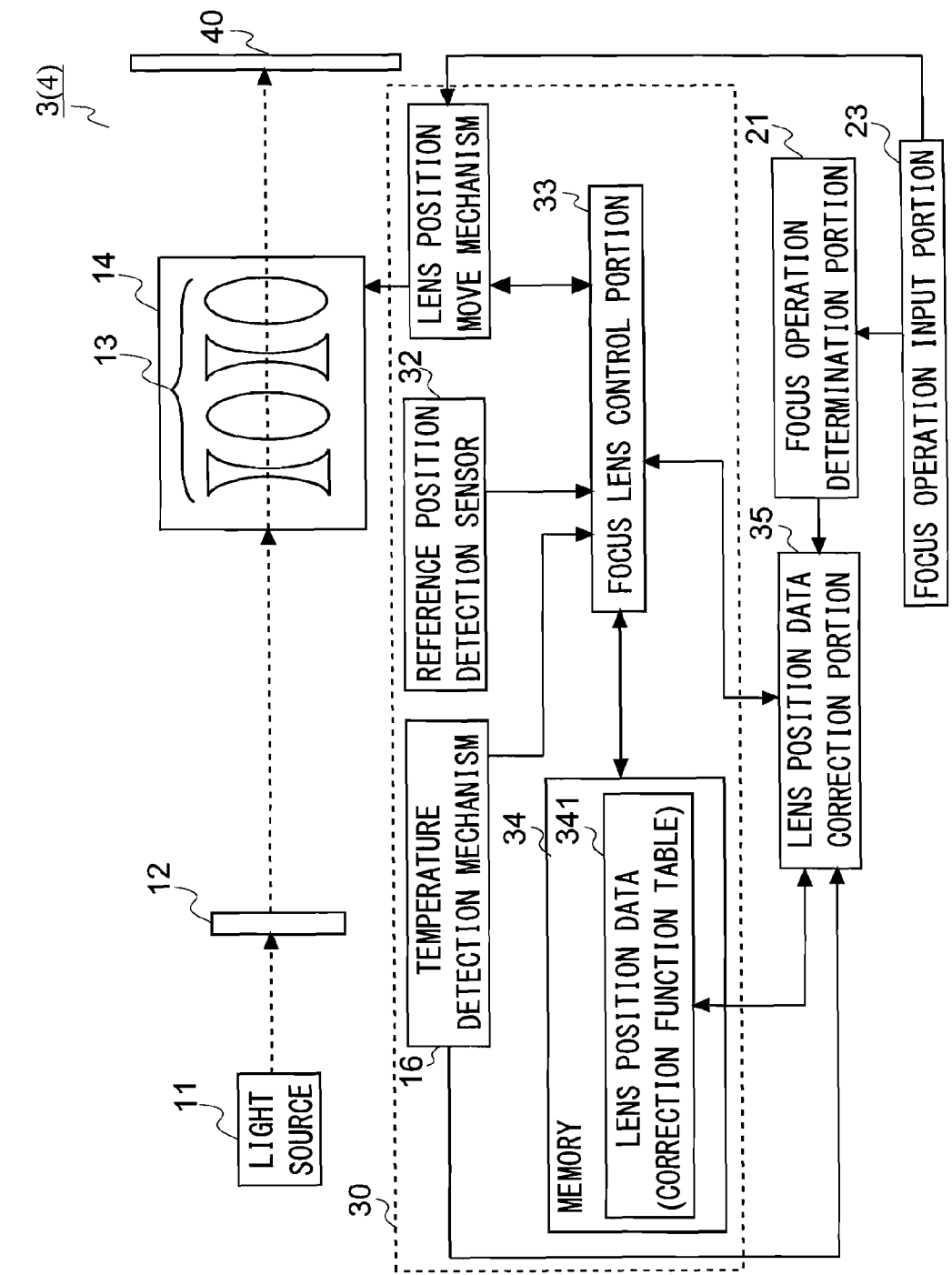
[FIG. 5] is a block diagram showing a structure of a projection type image display apparatus according to a third embodiment.

FIG. 5 is a block diagram showing a structure of the projection type image display apparatus in the third embodiment. The structures of the illumination optical system (inclusive of the light source 11), the image forming device 12, the projection optical system (inclusive of the projection lens group 13 and the lens hold frame 14), the temperature detection mechanism 16, the focus operation determination portion 21, and the focus operation input portion 23 that the projection type image display apparatus 23 in the third embodiment includes are the same as the projection type image display apparatus 1 in the first embodiment 1. Accordingly, these are indicated by the same reference numbers and description of them is skipped.

A lens position move mechanism 31 is able to move part of the lens hold frame 14 and move the focus lens held by the lens hold frame 14 along the optical-axis direction. This mechanism is able to be achieved, for example, by a structure that includes: a stepping motor; an output gear that is mounted on an output shaft of the stepping motor; and a gear groove (not shown) that is so formed on the lens hold frame 14 as to mesh with the output gear. Here, in the present embodiment, the lens position move mechanism 31 is achieved by the above structure.

Besides, the lens position move mechanism 31 is also operated, for example, by a button operation of the focus operation input portion 23 that is composed as a focus adjustment button. In this way, the user can perform the focus adjustment by manually adjusting the position of the focus lens.

A reference position detection sensor 32 gives the position of the focus lens that is included in the projection lens group 13 and movable by the lens position move mechanism 31 as a distance from a reference point disposed in the projection type image display apparatus 3. Hereinafter, the position given by the distance from this reference point is called an absolute position.

As the reference position detection sensor 32, it is possible to use a photointerrupter, for example. In this case, if a projection portion (not shown), which is disposed in the lens hold frame 14, is structured to block the light that goes from a light emitting portion to a light receiving portion of the photointerrupter at the time, for example, the focus lens reaches the reference position, it is possible to detect that the focus lens is situated at the reference position. Besides, as described above, because the stepping motor is used for the lens position move mechanism 31 that enables the movement of the focus lens, it is possible to obtain the absolute position of the focus lens by using the number of pulses from the reference position.

Here, the structure to give the position of the focus lens as the absolute position is not limited to the structure of the present embodiment. For example, the absolute position may be given from a potentiometer that interacts with the movement of the focus lens. Besides, the absolute position may be given by means of an encoder.

A focus lens control portion 33 controls the position of the focus lens based on the temperature given from the temperature detection mechanism 16. Besides, the focus lens control portion 33 is able to find the absolute position of the focus lens by using information obtained from the stepping motor that constitutes the lens position move mechanism 31.

To control the position of the focus lens based on the temperature given from the temperature detection mechanism 16, the focus lens control portion 33 uses a lens position table 341 that is stored in the memory 34. Specifically, the focus lens control portion 33, in response to the temperature obtained from the temperature detection mechanism 16, obtains the absolute position where the focus lens is to be disposed based on the lens position table 341. And, the focus lens control portion 33 gives an instruction to the lens position move mechanism 31 in such a way that the focus lens is situated at the obtained absolute position.

In the present embodiment, the lens position table 341, in default, stores a correction function table that is obtained by an experiment, for example. However, this correction function table is corrected to a better table by the lens position data correction portion 35. This point is described later.

In the projection type image display apparatus 3 in the third embodiment, the lens position move mechanism 31, the reference position detection sensor 32, the temperature detection mechanism 16, the focus lens control portion 33, and the memory 34 constitute the focus correction system 30 that corrects the time-dependent change of the focus of the projection optical system based on the temperature information. In a case where it is determined by the focus operation determination portion 21 that there is a focus operation that is not performed by the focus correction system 30 (which may be called the focus lens control portion 33), the focus correction system 30 corrects the correction condition that is currently performed. And, under the corrected condition (new condition), the correction by the focus correction system 30 is performed. The correction of the correction condition is performed by the lens position data correction portion 35.

Hereinafter, details of the lens position data correction portion 35 are described; however, before the description, to facilitate the understanding of the present invention, reasons the lens position data correction portion 35 is disposed are described.

Figure 6:
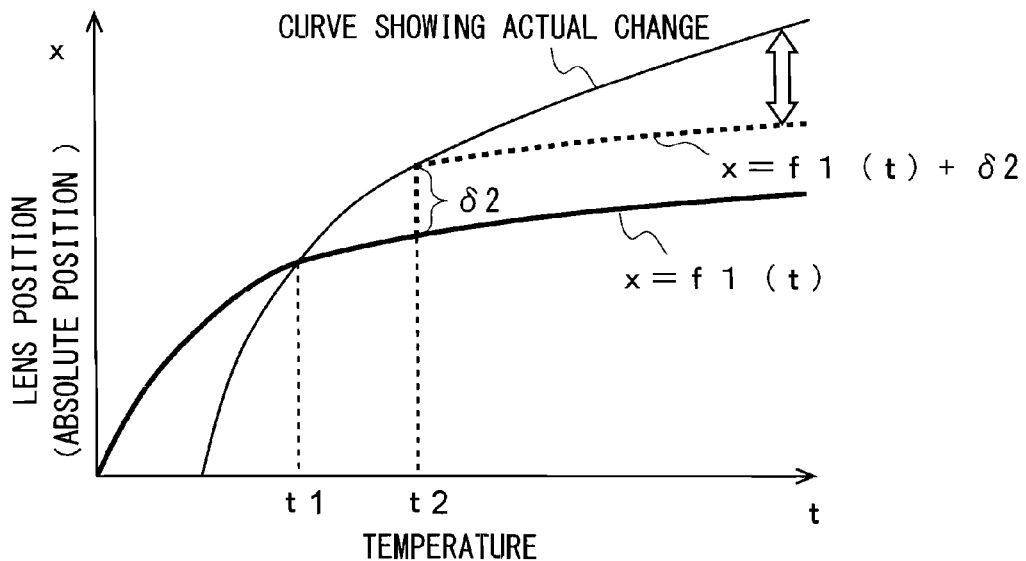
[FIG. 6] is a schematic diagram to describe a problem in a case where a lens position data correction portion is not disposed.

FIG. 6 is a schematic diagram to describe a problem in a case where the lens position data correction portion is not disposed. As shown in FIG. 6, a correction function table f1 stored in the lens position data 341 of the memory 34 as default is a function given by the temperature t on the lateral axis and the absolute position x of the focus lens on the vertical axis. The correction function table f1 is obtained by performing an experiment in advance.

Incidentally, there is a case where lenses that constitute the projection lens group 13 incorporated in the projection type image display apparatus 3 have unevenness in the production, or a case where unevenness occurs in the lens function depending on a use environment. Because of this, in some cases, a deviation occurs between the absolute position (absolute position given by "a curve showing an actual change" in FIG. 6) where the focus lens should be disposed at each temperature and the absolute position given by the correction function table f1 that is stored in advance. Accordingly, even if the correction by the focus correction system 30 is being performed, the user needs to manually (in other words, by using the focus operation input portion 23) deviate (δ2 in FIG. 6) the lens position in some cases.

As shown in FIG. 6, if a structure is employed, in which even after the absolute position of the focus lens is manually adjusted, the correction function table f1 is used (exactly, f1+δ2 is used: this is indicated by a curve shown by a thick broken line), a focus deviation occurs again even if the user performs the focus adjustment in advance. In other words, the user needs to perform the focus adjustment over and over again, which the user feels cumbersome. To resolve the problem, the lens position data correction portion 35 is disposed.

Figure 7:
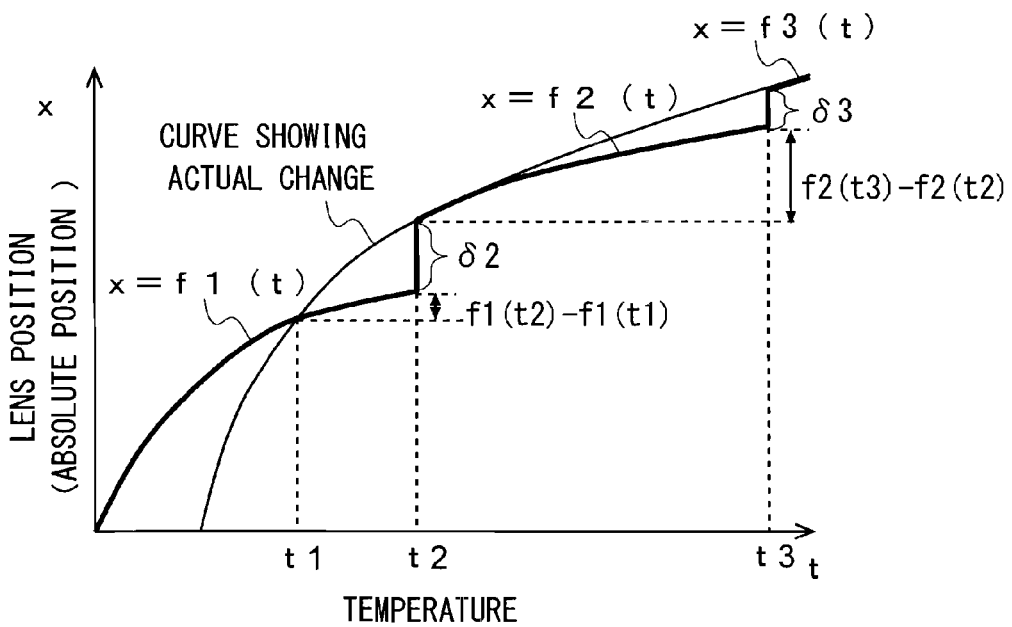
[FIG. 7] is a schematic diagram to describe operation of a lens position data correction portion that the projection type image display apparatus according to the third embodiment includes.

FIG. 7 is a schematic diagram to describe operation of the lens position data correction portion that the projection type image display apparatus in the third embodiment includes. The projection type image display apparatus 3, first, starts the correction by the focus correction system 30 in accordance with the lens position data 341 (correction function table f1 in FIG. 7) stored in the memory 34. Here, hereinafter, the correction by the focus correction system 30 is started at a temperature t1 in FIG. 7; the description is performed on the supposition that the projection type image display apparatus 3 is in focus at this time point.

Here, it is supposed that at a temperature t2, the focus deviation becomes large and the user manually moves the focus lens (movement of the focus lens that is not performed by the focus lens control portion 33). In this case, thereafter, if the correction by the focus correction system 30 is performed by using the above correction function table f1, the user needs to perform the focus adjustment again. Accordingly, the lens position data correction portion 35 obtains, from the focus operation determination portion 21, the information which notifies that there is the movement of the focus lens performed by the user and corrects the correction function table f1.

In the correction of the correction function table f1, for example, the gradient of the correction function table f1 may be corrected. An example of a correction function table f2 that is corrected by the lens position data correction portion 35 as described above is represented by the formula (1).

$$f2(t) = \frac{f1(t2) - f1(t1) + \delta 2}{f1(t2) - f1(t1)} \cdot f1(t - t1) + f1(t1) \qquad \text{[formula 1]}$$

where t1 is the start-time temperature of the correction by the focus correction system 30, f1 (t1) is the absolute position of the focus lens at the correction start time, t2 is the temperature during the time of the focus operation by the user, f1 (t2) is the absolute position of the focus lens immediately before the focus operation by the user, and δ2 is the movement amount of the focus lens by the user.

The lens position data correction portion 35 obtains the corrected correction function table f2; then, corrects the lens position data 341 of the memory 34 in such a way that thereafter, the corrected correction function table f2 is used at the temperature t1 or higher. And, after the correction of the lens position data 341 by the lens position data correction portion 35 is completed, the correction by the focus correction system 30 in accordance with the corrected correction function table f2 is performed.

Here, there is a case where even if the correction by the focus correction system 30 is performed in accordance with the corrected correction function table f2, the previous correction by the lens position data correction portion 35 is insufficient, and the focus-lens position is moved by the user again (movement by the movement amount δ3 at a temperature t3 in FIG. 7). In this case, the same correction of the lens position table 341 as the correction performed together with the movement of the focus-lens position by the user at the previous temperature t2 is performed.

In this case, a correction function table f3 corrected by the lens position data correction portion 35 is represented by the formula 2:

$$f3(t) = \frac{f2(t3) - f2(t2) + \delta 3}{f2(t3) - f2(t2)} \cdot f2(t - t2) + f2(t2) \qquad \text{[formula 2]}$$

where f2 (t2) is the absolute position of the focus lens immediately after the previous focus operation by the user, t3 is the temperature during the focus operation that is performed again by the user, f2 (t3) is the absolute position of the focus lens immediately before the focus operation that is performed again by the user, and δ3 is the movement amount of the focus lens in the focus operation that is performed again by the user. The others are the same as those in the [formula 1].

The lens position data correction portion 35 obtains the corrected correction function table f3; then, corrects the lens position data 341 of the memory 34 in such a way that thereafter, the corrected correction function table f3 is used at the temperature t2 or higher. And, after the correction of the lens position data 341 by the lens position data correction portion 35 is completed, the correction by the focus correction system 30 in accordance with the corrected correction function table f3 is performed.

Figure 8:
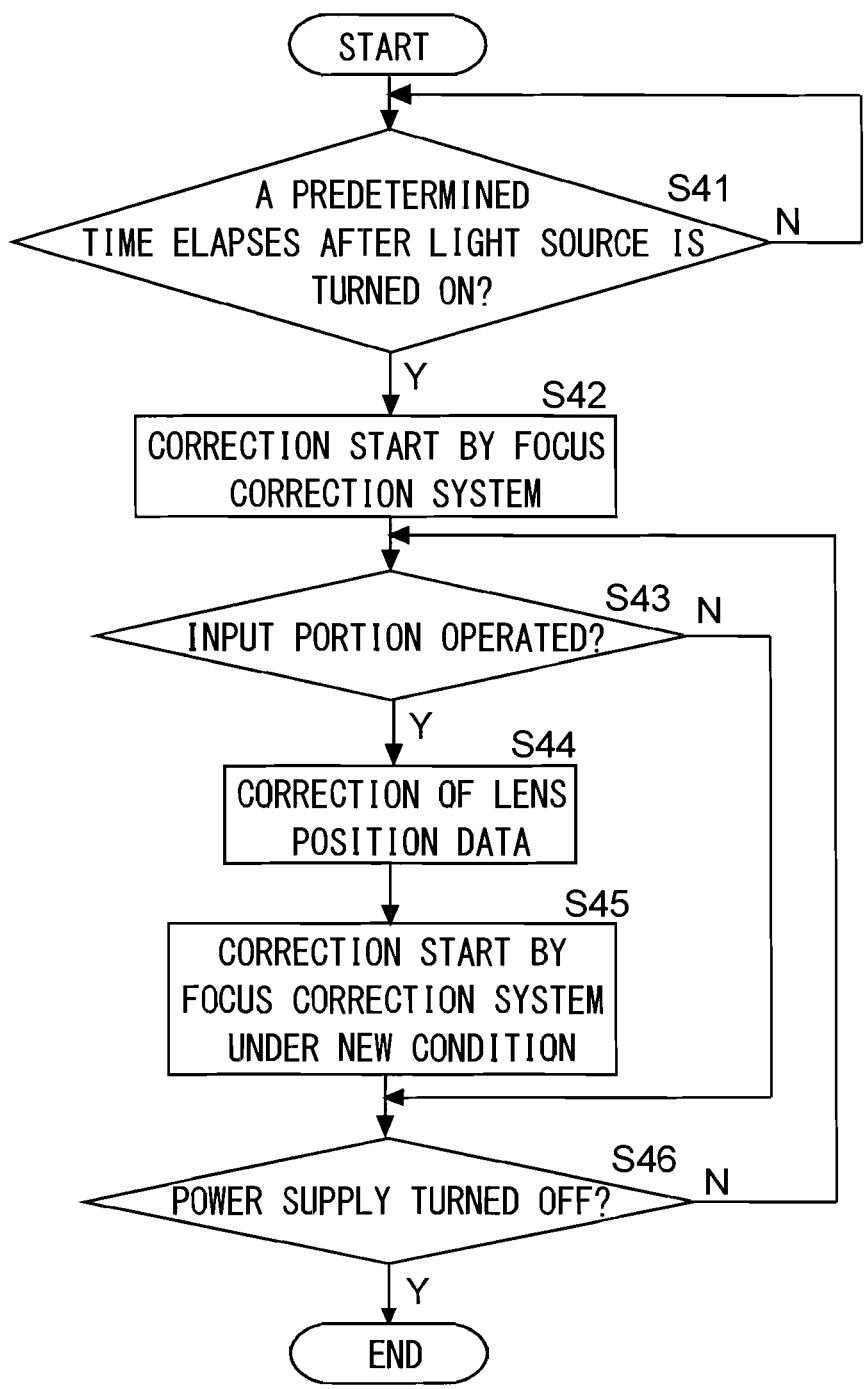
[FIG. 8] is a flow chart showing a flow that controls operation of a focus correction system in the projection type image display apparatus according to the third embodiment.

Next, a flow for controlling the operation of the focus correction system 30 in the projection type image display apparatus 3 of the third embodiment that is structured as described above is described with reference to a flow chart in FIG. 8.

In the projection type image display apparatus 3 as well in the present embodiment, like the projection type image display apparatus 1 in the first embodiment, it is checked whether or not a predetermined time elapses after the light source 11 is turned on (step S41). This check is performed by the focus lens control portion 33, for example; and if the predetermined time elapses, the correction by the focus correction system 30 is started (step S42).

Here, it is supposed that the focus lens is adjusted to be in focus at the start time of the correction by the focus correction system 30. In some cases, this adjustment is able to be performed automatically by the above learning function (function achieved by the lens position data correction portion 35) that the projection type image display apparatus has; and in other cases, the user performs manually this adjustment.

If the correction by the focus correction system 30 is started, it is monitored by the focus operation determination portion 21 whether or not there is an operation of the focus operation input portion 23 (step S43). In a case where there is an operation of the focus operation input portion 23 (case where there is a movement of the focus lens that is not performed by the focus lens control portion 33), the focus operation determination portion 21 notifies the lens position data correction portion 35 of the presence information. And, the correction of the lens position data 341 stored in the memory 34 is performed by the lens position data correction portion 35 (step S44).

This correction corresponds to the above correction in which for example, the correction function table f2 is obtained from the correction function table f1 based on the movement amount of the focus lens by the user; and the lens position table 341 is corrected. Here, the movement amount of the focus-lens position by the user is represented by δ2, for example, in FIG. 7, which is the movement amount of the focus lens that is not performed by the focus lens control portion 33.

If the correction of the lens position data 341 is performed by the lens position data correction portion 35, the correction by the focus correction system 30 is started in accordance with the corrected lens position data (new condition) (step S45). Thereafter, it is checked whether or not the power supply of the projection type image display apparatus 3 is to be turned off (step S46); if the power supply is not turned off, the steps S43 to S46 are repeated.

Here, in a case where there is not an operation of the focus operation input portion 23 (No in the step S43), it is checked whether or not the power supply of the projection type image display apparatus 3 is to be turned off (step S46); in a case where the power supply is not turned off, the steps S43 to S46 are repeated.

In the projection type image display apparatus 3 as structured above, in a case where the correction of the lens position data 341 by the lens position data correction portion 35 is performed, the next and following corrections by the focus correction system 30 are performed based on the corrected lens position data 341. The case shown in FIG. 7 is described as an example; the correction by the focus correction system 30 is started in accordance with the correction function table f1 in a case where the temperature (temperature detected by the temperature detection mechanism 16) at the use start time of the projection type image display apparatus 3; in accordance with the correction function table f2 in a case where the temperature is t1 or higher and t2 or lower; and in accordance with the correction function table f3 in a case where the temperature is t2 or higher. In other words, because the focus correction system 30 is started based on the fact that the focus lens is in focus in advance, a suitable correction is performed.

Here, the third embodiment described above has the structure in which it is determined based on the input from the focus operation input portion 23 whether or not there is a focus operation (presence of a movement of the focus lens); however, the structure for determining whether or not there is a focus operation is not limited to this. Specifically, for example, as the same structure as the second embodiment, of course, a structure may be employed, in which it is determined whether or not there is a focus operation based on the information from the displacement sensor. In this case, not only in a case where the focus operation is performed by the user but also in a case where there is a focus operation that is performed by the auto-focus function, it is possible to determine that there is a focus operation that is not performed by the focus lens control portion 33.

Besides, in the third embodiment described above, it is supposed that the focus operation by the user is performed because the data prepared in the lens position table 341 in advance are inappropriate. However, for example, in a case where a zoom adjustment is performed (in this case, of course, it is necessary to use a different correction function table) and the like, although the data prepared in the lens position table 341 in advance are appropriate, the focus operation by the user is performed in some cases. Accordingly, in a case where an operation that, as a matter of course, needs to change the function table used by the focus correction system occurs in use of the projection type image display apparatus, a structure may be employed, in which, for example, the fact there is such an operation is notified to the lens position data correction portion 35.

As a specific example, in a case where the zoom adjustment is performed, the information is transmitted to the lens position data correction portion 35. For example, because the zoom adjustment is preformed by a button operation or the like, such transmission of the information is possible. And, in the case where the zoom adjustment is performed, even if it is determined by the focus operation determination portion 21 that there is a focus operation, the lens position data correction portion 35 does not correct the lens position data 341. Besides, the focus lens control portion 33 may be notified that the zoom adjustment is performed and it is necessary to change the correction function table to be used. In this way, it is possible to perform the correction by the focus correction system by suitably dealing with the focus operation by the user.

<<Fourth Embodiment>>

Next, a projection type image display apparatus in a fourth embodiment is described. The structure of the projection type image display apparatus 4 in the fourth embodiment is the same as the projection type image display apparatus 3 in the third embodiment shown in FIG. 5. Accordingly, the same structures are indicated by the same reference numbers and description of them is skipped.

Figure 9:
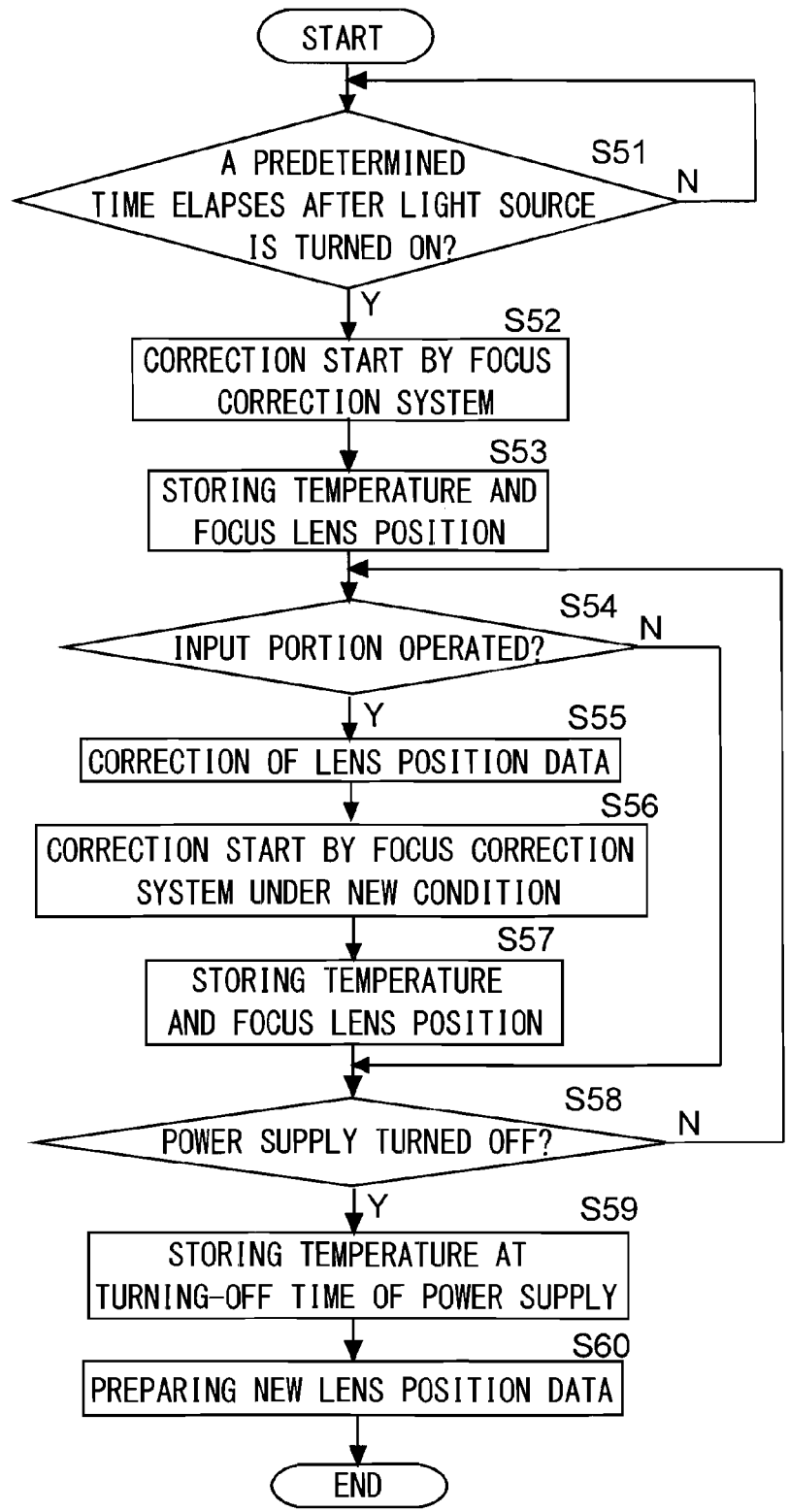
[FIG. 9] is a flow chart showing a flow that controls operation of a focus correction system in a projection type image display apparatus according to a fourth embodiment.
Figure 10:
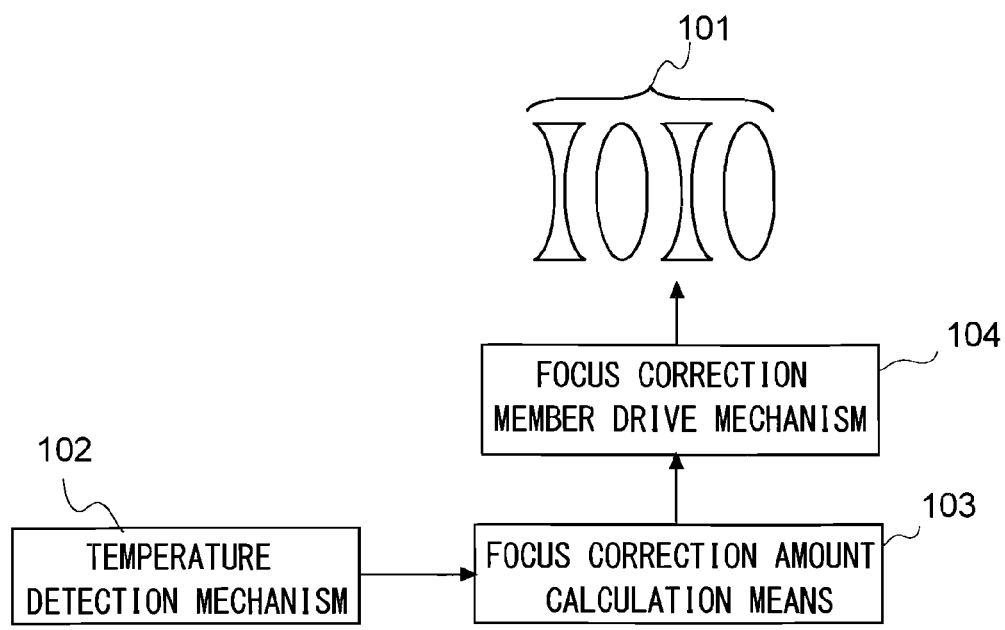
[FIG. 10] is a block diagram showing a conventional structure that prevents a focus deviation of a lens due to a temperature change.

The projection type image display apparatus 4 in the fourth embodiment has a learning function to correct the lens position data 341 before turning off the power supply of the apparatus depending on the use history. Description about this is performed with reference to a flow chart shown in FIG. 9. FIG. 9 is a flow chart showing a flow for controlling the operation of the focus correction system in the projection type image display apparatus in the fourth embodiment.

First, it is checked whether or not a predetermined time elapses after the light source 11 is turned on (step S51). This check is performed by the focus lens control portion 33, for example; and if the predetermined time elapses, the correction by the focus correction system 30 is started (step S52). Here also, like in the third embodiment, it is supposed that the focus lens is adjusted to be in focus at the start time of the correction by the focus correction system 30.

At substantially the same time the correction by the focus correction system 30 is started, for example, the absolute position x of the focus lens at the start time of the correction by the focus correction system 30 and the temperature t detected by the temperature detection mechanism 16 at the start time of the correction by the focus correction system 30 are stored into the memory 34 (step S53) by the lens position data correction portion 35.

Thereafter, it is monitored by the focus operation determination portion 21 whether or not there is an operation of the focus operation input portion 23 (step S54). In a case where there is an operation of the focus operation input portion 23 (case where there is a movement of the focus lens that is not performed by the focus lens control portion 33), the focus operation determination portion 21 notifies the lens position data correction portion 35 of the presence information. And, the correction of the lens position data 341 stored in the memory 34 is performed by the lens position data correction portion 35 (step S55). Because the details of the correction are the same as the third embodiment, description of them is skipped.

If the correction of the lens position data 341 is performed by the lens position data correction portion 35, the correction by the focus correction system 30 is started in accordance with the corrected lens position data (new condition) (step S56). At substantially the same time the correction by the focus correction system 30 is started, for example, the absolute position x of the focus lens at the start time of the correction by the focus correction system 30 and the temperature t detected by the temperature detection mechanism 16 at the start time of the correction by the focus correction system 30 are stored into the memory 34 by the lens position data correction portion 35 (step S57).

Thereafter, it is checked whether or not the power supply of the projection type image display apparatus 3 is to be turned off (step S58); in a case where the power supply is not turned off, the steps S54 to S58 are repeated. Here, in a case where there is not an operation of the focus operation input portion 23 (No in the step S54), it is checked whether or not the power supply of the projection type image display apparatus 3 is to be turned off (step S58); in a case where the power supply is not turned off, the steps S54 to S58 are repeated.

In a case where the power supply of the projection type image display apparatus 3 is turned off (Yes in the step S58), the temperature (temperature detected by the temperature detection mechanism 16) at the time point the instruction for the turning-off of the power supply is given is stored into the memory 34 (step S59). This step S59 may not be necessarily performed; however, if the temperature at the end time is stored in the memory 34, at the next time of turning on the power supply, the focus correction system 30 can be performed even if the user does not adjust the position of the focus lens, which is convenient.

Specifically, if the temperature detected by the temperature detection mechanism 16 at the time of turning off the power supply is stored in the memory 34, it is possible to perform the following processes in the projection type image display apparatus 4. First, at the time the power supply is turned on, the temperature detected by the temperature detection mechanism 16 and the temperature at the end time point stored in the memory 34 are compared with each other. In a case where it is determined based on the comparison that both are different from each other, the absolute position of the focus lens is obtained based on the temperature at the end time point stored in the memory 34. And, it is calculated how much the absolute position of the focus lens should be moved to be in focus at the temperature at the turning-on time of the power supply. For this calculation, the lens position data 341 (if corrected, the corrected data) are used. According to this structure, the focus lens can be put in a focused state even if the user does not adjust the focus at the turning-on time of the power supply, which is convenient.

Back to FIG. 9, the temperature at the turning-off time of the power supply is stored, based on the absolute position x of the focus lens and the temperature t stored (see the steps S53, S57) previously in the memory 34, new lens position data are prepared (step S60) by the lens position data correction portion 35 and then the apparatus power supply is turned off.

The new lens position data are obtained by calculating an approximate function based on the absolute position of the focus lens and the temperature stored in the memory 34. And, the lens position data 341 are corrected in such a way that the obtained approximate function becomes a correction function table in the temperature range where the data are obtained or in a higher temperature range; and this becomes the new lens position data. As a result, because the correction by the focus correction system 30 is performed based on the new lens position data (learned lens position data) at the next turning-on time of the power supply, the correction by the focus correction system 30 is suitably performed.

Here, the approximate function may be obtained by a known method; for example, in a case where n data are obtained, the optimum function may be obtained from a function of (n−1) degree or less.

Besides, the fourth embodiment has the structure in which at the time point the focus correction system 30 is started for the first time; and at the time point the lens position data 341 are corrected and the focus correction system 30 is started under the new condition, the temperature detected by the temperature detection mechanism 16 and the absolute position of the focus lens are stored into the memory 34. This is because if the information obtained at such timing is used, it is possible to prepare new lens position data by using the information at the time point the focus is suitably adjusted. However, it is not limited to the timing in the present embodiment; another structure may be employed if the temperature and the absolute position data can be collected at timing the focus is suitably adjusted.

(Others)

The embodiments described above are only examples of the projection type image display apparatus according to the present invention and various modifications are possible without departing from the object of the present invention.

For example, in the embodiments described above, the structure is employed, in which the focus correction system 30 performs the focus correction based on the temperature information. However, the present invention is of course applicable even to a structure in which the focus correction system performs the focus correction based on another physical amount. As such a physical amount, for example, there is time, brightness information obtained from an image source and a combination of these amounts and temperature.

Industrial Applicability

According to the projection type image display apparatus of the present invention, it is possible to suitably perform the focus adjustment by using the system that corrects the time-dependent change of the focus based on a specific physical amount. Accordingly, the present invention is suitably applicable to a projector, a rear projection television set and the like, for example.

The invention claimed is:

1. A projection type image display apparatus comprising:
    a projection optical system having a focus lens whose position is movable along an optical axis;
    a temperature sensor configured to measure a temperature of the projection optical system;
    a memory configured to store therein correction information in a correction table, for correcting a position of the focus lens in accordance with the measured temperature;
    a focus lens control portion configured to perform control for correcting the position of the focus lens to be placed, based on the measured temperature and the correction information, the correction information stored in advance in the correction table in the memory, before control is performed by the focus lens control portion;
    an input portion through which a user manually adjusts the position of the focus lens, wherein control for correcting the position of the focus lens is performed prior to a manual adjustment of the focus lens by the user;
    a determination portion that determines if there is an operation of the input portion by the user; and
    a correction portion configured to correct and rewrite at least a portion of the correction information in the correction table in the memory, based on an amount of movement of the focus lens caused by the input portion if the determination portion determines that there is an operation of the input portion after the focus lens control portion starts to perform control for correcting the position of the focus lens, and to store the corrected correction information in the correction table as rewritten correction information in the memory.

2. The projection type image display apparatus according to claim 1, wherein
    if the determination portion determines that there is an operation of the input portion after the focus lens control portion starts to perform control for correcting the position of the focus lens, a temperature and a position of the focus lens immediately after the focus lens is moved by the input portion are stored in the memory; and
    the correction portion, immediately before turning-off a power supply of the apparatus, further corrects the correction information based on the measured temperature and the position of the focus lens that are stored in the memory.

3. The projection type image display apparatus according to claim 1, wherein the correction information comprises:
    a predetermined function table, and
    wherein the correction portion corrects the predetermined function table based on the amount of movement of the focus lens moved by use of the input portion.

4. The projection type image display apparatus according to claim 3, wherein
    the correction portion corrects the predetermined function table using the following formula:

$$f2(t) = \left\{ \frac{f1(t2) - f1(t1) + \delta 2}{f1(t2) - f1(t1)} \cdot f1(t - t1) + f1(t1) \right\}$$

where
    f2 (t) is a modified correction function of temperature t;
    t1 is a start-time temperature of the correction;
    f1 (t) is a correction function before being corrected;
    f1(t1) is a position of the focus lens at the start-time temperature of the correction;
    t2 is a temperature during a time of the focus lens movement performed by the input portion;
    f1(t2) is a position of the focus lens immediately before the focus lens movement performed by the input portion; and
    δ2 is a movement amount of the focus lens performed by the input portion.

* * * * *